US006038119A

United States Patent [19]

Atkins et al.

[11] Patent Number: 6,038,119

[45] Date of Patent: Mar. 14, 2000

[54] OVERVOLTAGE PROTECTION DEVICE INCLUDING WAFER OF VARISTOR MATERIAL

[76] Inventors: Ian Paul Atkins, 203 Gentlewoods Dr., Cary, N.C. 27511; Robert Michael Ballance, 3628 Bond St., Raleigh, N.C. 27604; Jonathan Conrad Cornelius, 315 Angier Rd., Fuquay-Varina, N.C. 27526; Sherif I. Kamel, 209 Stillman Creek Dr., Apex, N.C. 27502; John Anthony Kizis, 104 Maple La., Fuquay-Varina, N.C. 27526; Clyde Benton Mabry, III, 1921E New Garden Rd., #105, Greensboro, N.C. 27410

[21] Appl. No.: 09/157,875

[22] Filed: Sep. 21, 1998

[51] Int. Cl.$^{7}$ ...................................................... H02H 1/00

[52] U.S. Cl. ............................................ 361/127; 361/118

[58] Field of Search .................. 361/117–119, 126–127, 361/56, 111, 91.1; 338/20, 21, 22 R

[56] References Cited

U.S. PATENT DOCUMENTS

| | | | |
|---|---|---|---|
| 2,311,758 | 2/1943 | Johansson . | |
| 4,425,017 | 1/1984 | Chan | 339/96 |
| 4,595,635 | 6/1986 | Dubrow et al. | 428/447 |
| 4,600,261 | 7/1986 | Debbaut | 339/116 C |
| 4,701,574 | 10/1987 | Shimirak et al. | 174/93 |
| 5,519,564 | 5/1996 | Carpenter | 361/127 |
| 5,529,508 | 6/1996 | Chiotis et al. | 439/204 |
| 5,588,856 | 12/1996 | Collins et al. | 439/204 |
| 5,721,664 | 2/1998 | Uken et al. | 361/125 |

FOREIGN PATENT DOCUMENTS

| | | |
|---|---|---|
| 0 108 518 B1 | 5/1984 | European Pat. Off. . |
| 0 203 737 A2 | 12/1986 | European Pat. Off. . |
| 3428258 A1 | 2/1986 | Germany . |
| WO 88/00603 | 1/1988 | WIPO . |
| WO 90/05401 | 5/1990 | WIPO . |
| WO 95/15600 | 6/1995 | WIPO . |
| WO 95/24756 | 9/1995 | WIPO . |
| WO 97/42693 | 11/1997 | WIPO . |

OTHER PUBLICATIONS

Data Book Library 1997, *Passive Components*, Siemens Matsushita Components, 1997, pp. 15–17, 26–32, 36–37, 39, 161, 166, 167, 169, 171–174.

*Primary Examiner*—Michael J. Sherry

*Attorney, Agent, or Firm*—Marguerite E. Gerstner; Myers Bigel Sibley & Sajovec

[57] ABSTRACT

An overvoltage protection device includes a first electrode member having a first substantially planar contact surface and a second electrode member having a second substantially planar contact surface facing the first contact surface. A wafer formed of varistor material and having first and second opposed, substantially planar wafer surfaces is positioned between the first and second contact surfaces with the first and second wafer surfaces engaging the first and second contact surfaces, respectively. The contact surfaces may apply a load to the wafer surfaces. Preferably, the electrode members have a combined thermal mass which is substantially greater than a thermal mass of the wafer. The wafer may be formed by slicing a rod of varistor material. The device may include a housing including the first substantially planar contact surface and a sidewall, the housing defining a cavity within which the second electrode is disposed.

48 Claims, 11 Drawing Sheets

OVERVOLTAGE PROTECTION DEVICE INCLUDING WAFER OF VARISTOR MATERIAL

FIELD OF THE INVENTION

The present invention relates to voltage surge protection devices and, more particularly, to a voltage surge protection device including a wafer of varistor material.

BACKGROUND OF THE INVENTION

Frequently, excessive voltage is applied across service lines which deliver power to residences and commercial and institutional facilities. Such excess voltage or voltage spikes may result from lightning strikes, for example. The voltage surges are of particular concern in telecommunications distribution centers, hospitals and other facilities where equipment damage caused by voltage surges and resulting down time may be very costly.

Typically, one or more varistors (i.e., voltage dependent resistors) are used to protect a facility from voltage surges. Generally, the varistor is connected directly across an AC input and in parallel with the protected circuit. The varistor has a characteristic clamping voltage such that, responsive to a voltage increase beyond a prescribed voltage, the varistor forms a low resistance shunt path for the overvoltage current that reduces the potential for damage to the sensitive components. Typically, a line fuse may be provided in the protective circuit and this line fuse is blown or weakened by the essentially short circuit created by the shunt path.

Varistors have been constructed according to several designs for different applications. For heavy duty applications (e.g., surge current capability in the range of from about 60 to 100 kA) such as protection of telecommunications facilities, block varistors are commonly employed. A block varistor typically includes a disk shaped varistor element potted in a plastic housing. The varistor disk is formed by pressure casting a metal oxide material, such as zinc oxide, or other suitable material such as silicon carbide. Copper, or other electrically conductive material, is flame sprayed onto the opposed surfaces of the disk. Ring shaped electrodes are bonded to the coated opposed surfaces and the disk and electrode assembly is enclosed within the plastic housing. Examples of such block varistors include Product No. SIOV-B860K250 available from Siemens Matsushita Components GmbH & Co. KG and Product No. V271BA60 available from Harris Corporation.

Another varistor design includes a high energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

The varistor constructions described above often perform inadequately in service. Often, the varistors overheat and catch fire. Overheating may cause the electrodes to separate from the varistor disk, causing arcing and further fire hazard. There may be a tendency for pinholing of the varistor disk to occur, in turn causing the varistor to perform outside of its specified range. During high current impulses, varistor disks of the prior art may crack due to piezoelectric effect, thereby degrading performance. Failure of such varistors has led to new governmental regulations for minimum performance specifications. Manufacturers of varistors have found these new regulations difficult to meet.

SUMMARY OF THE INVENTION

It is, therefore, an object of the present invention to provide a varistor device having improved resistance to overheating and fire when an overvoltage is applied across the varistor device.

It is a further object of the present invention to provide such a varistor device which exhibits a low inductance and a low resistance when an overvoltage is applied across the varistor device.

Moreover, it is another object of the present invention to provide a varistor device of the type including a varistor wafer and that allows substantially uniform current distribution through the wafer and minimizes the occurrence of high current hot spots.

In order to provide the foregoing and other objects, the present invention is directed to an overvoltage protection device which provides a number of advantages for safely, durably and consistently handling extreme and repeated overvoltage conditions. The device includes a wafer of varistor material and a pair of electrode members, one of which is preferably a housing, having substantially planar contact surfaces for engaging substantially planar surfaces of the wafer.

Preferably, the electrodes have relatively large thermal masses as compared to the thermal mass of the varistor wafer so as to absorb a significant amount of heat from the varistor wafer. In this manner, the device reduces heat induced destruction or degradation of the varistor wafer as well as any tendency for the varistor wafer to produce sparks or flame. The relatively large thermal masses of the electrodes and the substantial contact areas between the electrodes and the varistor wafer also provide a more uniform temperature distribution in the varistor wafer, thereby reducing hot spots and resultant localized depletion of the varistor material.

Preferably, the electrodes are mechanically loaded against the varistor wafer. Preferably, biasing means are used to provide and maintain the load. The loading preferably provides a more even current distribution through the varistor wafer. As a result, the device responds to overvoltage conditions more efficiently and predictably, and high current spots which may cause pinholing are more likely to be avoided. Also, the tendency for the varistor wafer to warp responsive to high current impulses is prevented or reduced by the mechanical reinforcement provided by the electrodes. Moreover, during an overvoltage event, the device would be expected to provide lower inductance and lower resistance because of the more uniform and efficient current distribution through the varistor wafer.

Preferably, the device includes a metal housing and further components configured to prevent or minimize the expulsion of flame, sparks and/or varistor material upon overvoltage failure of the varistor wafer. Preferably, the wafer is formed by slicing the wafer from a rod of the varistor material.

BRIEF DESCRIPTION OF THE DRAWINGS

The accompanying drawings which form a part of the specification, illustrate key embodiments of the present invention. The drawings and description together, serve to fully explain the invention. In the drawings.

DETAILED DESCRIPTION OF THE PREFERRED EMBODIMENTS

Figure 1:
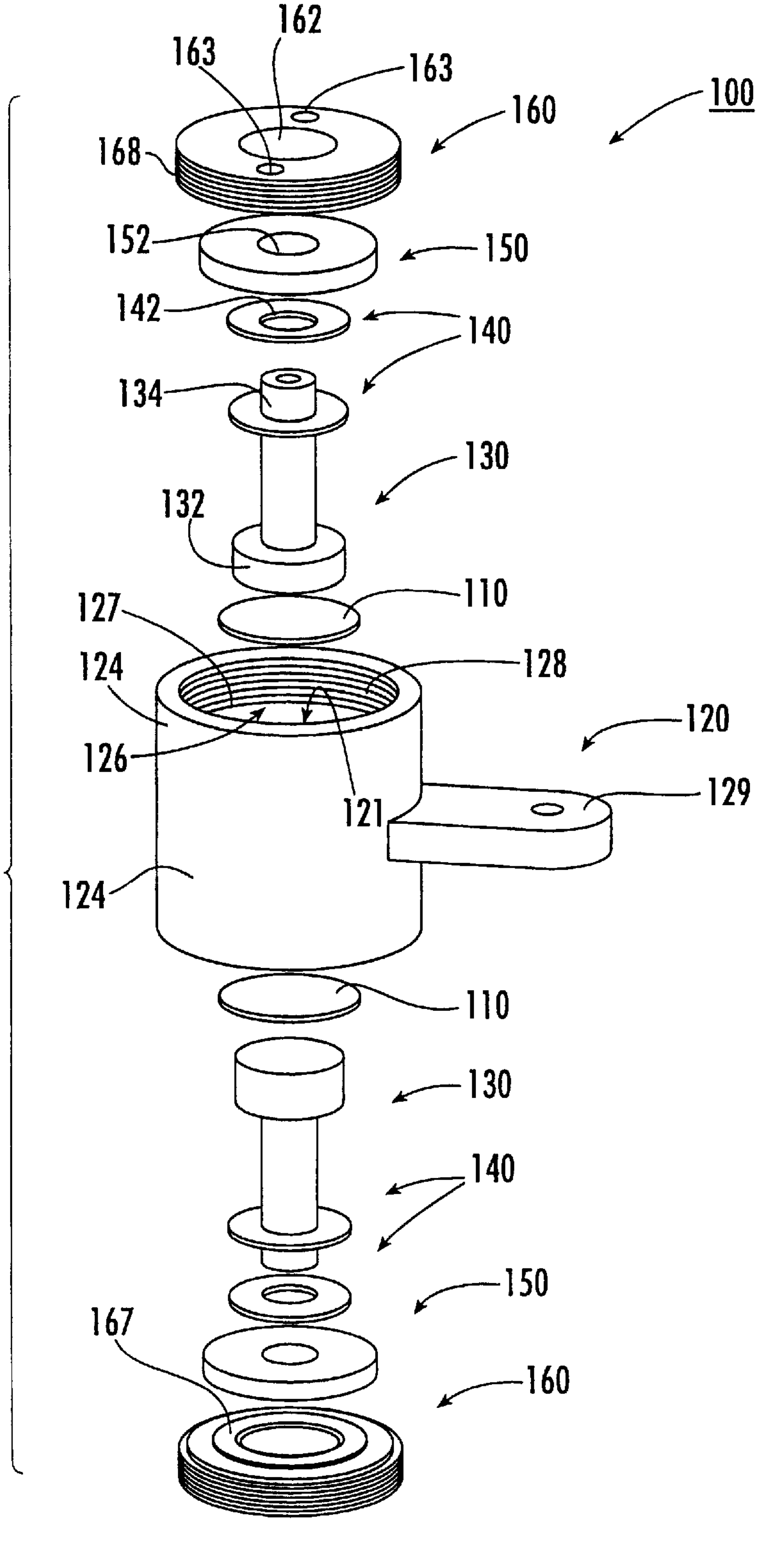
FIG. 1 is an exploded, perspective view of a varistor device according to the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
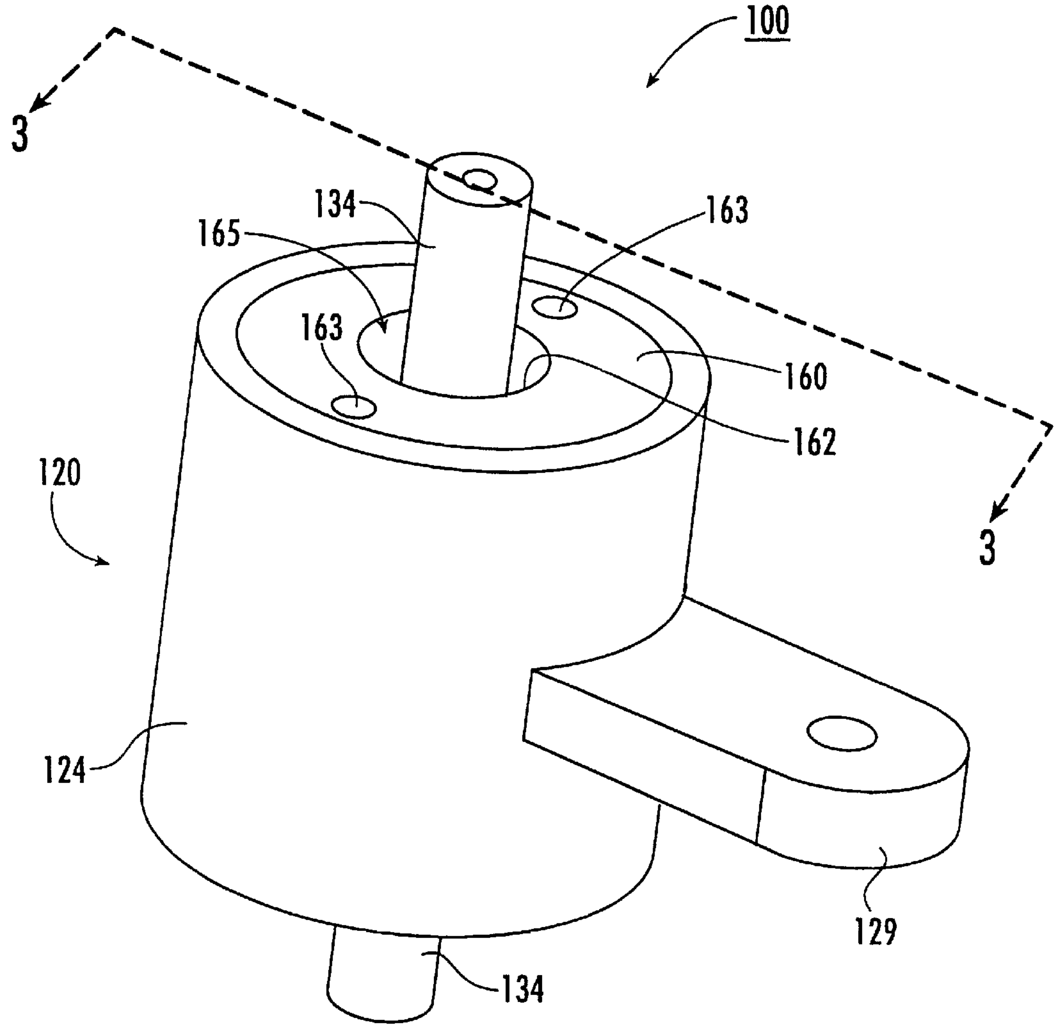
FIG. 2 is a top perspective view of the varistor device of FIG. 1.
Figure 3:
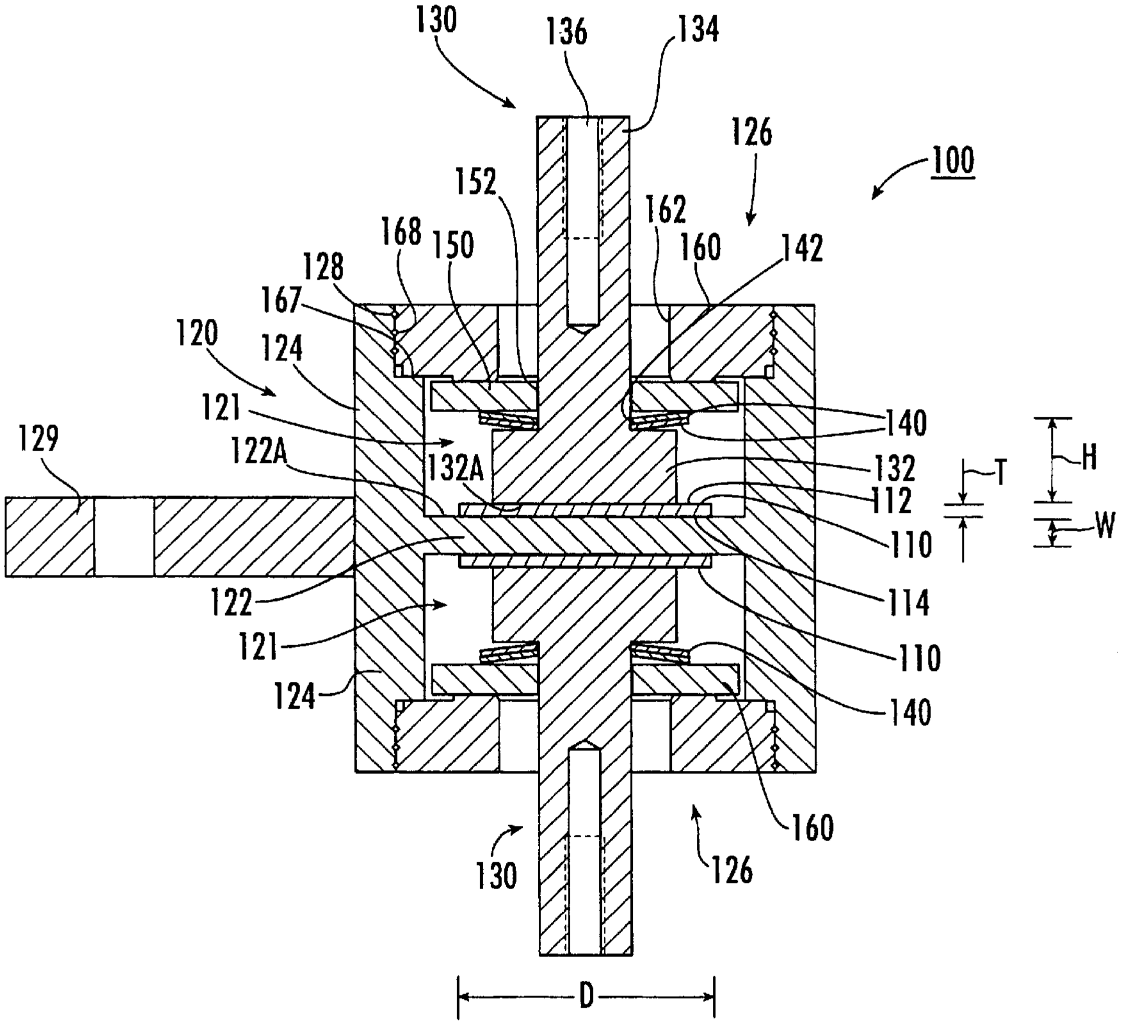
FIG. 3 is a cross-sectional view of the varistor device of FIG. 1 taken along the line 3—3 of FIG. 2.

With reference to FIGS. 1–3, an overvoltage protection device according to a first embodiment of the present invention is shown therein and designated 100. The device 100 includes a housing 120 of generally cylindrical shape. The housing is preferably formed of aluminum. However, any suitable conductive metal may be used. The housing has a center wall 122 (FIG. 3), cylindrical walls 124 extending from the center wall in opposite directions, and a housing electrode ear 129 extending outwardly from the walls 124. The housing is preferably unitary and axially symmetric as shown. The cylindrical walls 124 and the center wall 122 form cavities 121 on either side of the center wall, each cavity communicating with a respective opening 126.

A piston-shaped electrode 130 is positioned in each of the cavities 121. Shafts 134 of the electrodes 130 project outwardly through the respective openings 126. The electrodes 130 are preferably formed of aluminum. However, any suitable conductive metal may be used. Additionally, and as discussed in greater detail below, a varistor wafer 110, spring washers 140, an insulator ring 150 and an end cap 160 are disposed in each cavity 121.

In use, the device 100 may be connected directly across an AC or DC input, for example, in an electrical service utility box. Service lines are connected directly or indirectly to the electrode shafts 134 and the housing electrode ear 129 such that an electrical flow path is provided through the electrodes 130, the varistor wafers 110, the housing center wall 122 and the housing electrode ear 129. In the absence of an overvoltage condition, the varistor wafers 110 provide high resistances such that no current flows through the device 100 as it appears electrically as an open circuit. In the event of an overvoltage condition (relative to the design voltage of the device), the resistances of the varistor wafers decrease rapidly, allowing current to flow through the device 100 and create a shunt path for current flow to protect other components of an associated electrical system. The general use and application of overvoltage protectors such as varistors is well known to those of skill in the art and, accordingly, will not be further detailed herein.

As will be appreciated from the Figures, the device 100 is axially symmetric, the upper and lower halves of the device 100 being constructed in the same manner. Accordingly, the device 100 will be described hereinafter with respect to the upper portion only, it being understood that such description applies equally to the lower portion.

Turning to the construction of the device 100 in greater detail, the electrode 130 has a head 132 and an integrally formed shaft 134. As best seen in FIG. 3, the head 132 has a substantially planar contact surface 132A which faces a substantially planar contact surface 122A of the housing center wall 122. The varistor wafer 110 is interposed between the contact surfaces 122 and 132. As described in more detail below, the head 132 and the center wall 122 are mechanically loaded against the varistor wafer 110 to ensure firm and uniform engagement between the surfaces 112 and 132A and between the surfaces 114 and 122A. A threaded bore 136 is formed in the end of the shaft 134 to receive a bolt for securing a bus bar or other electrical connector to the electrode 130.

Figure 4:
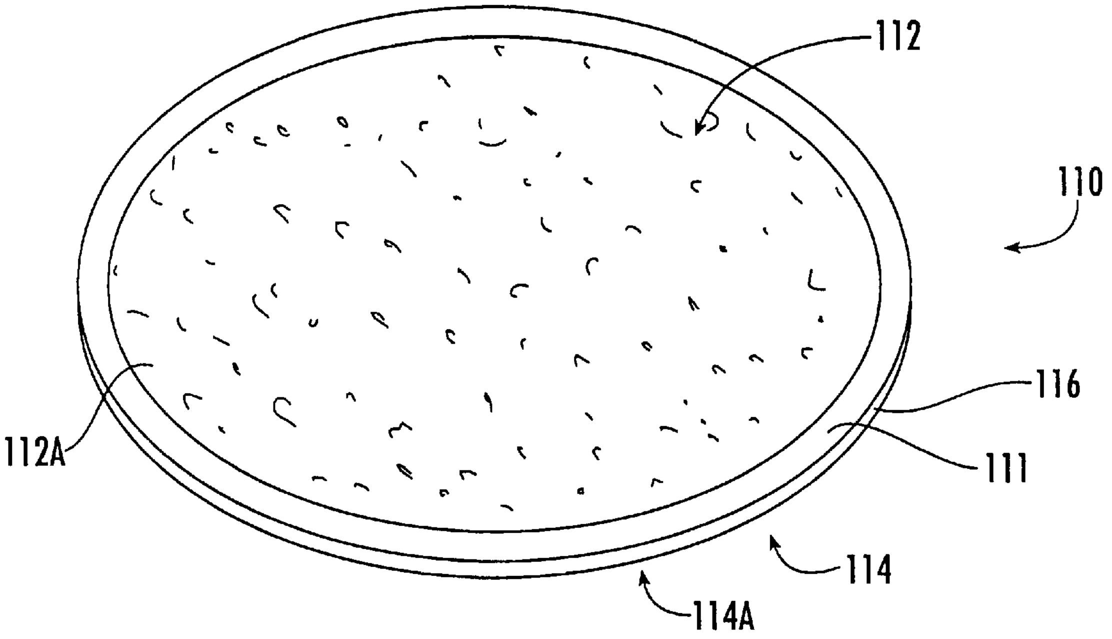
FIG. 4 is a perspective view of a varistor wafer.
Figure 5:
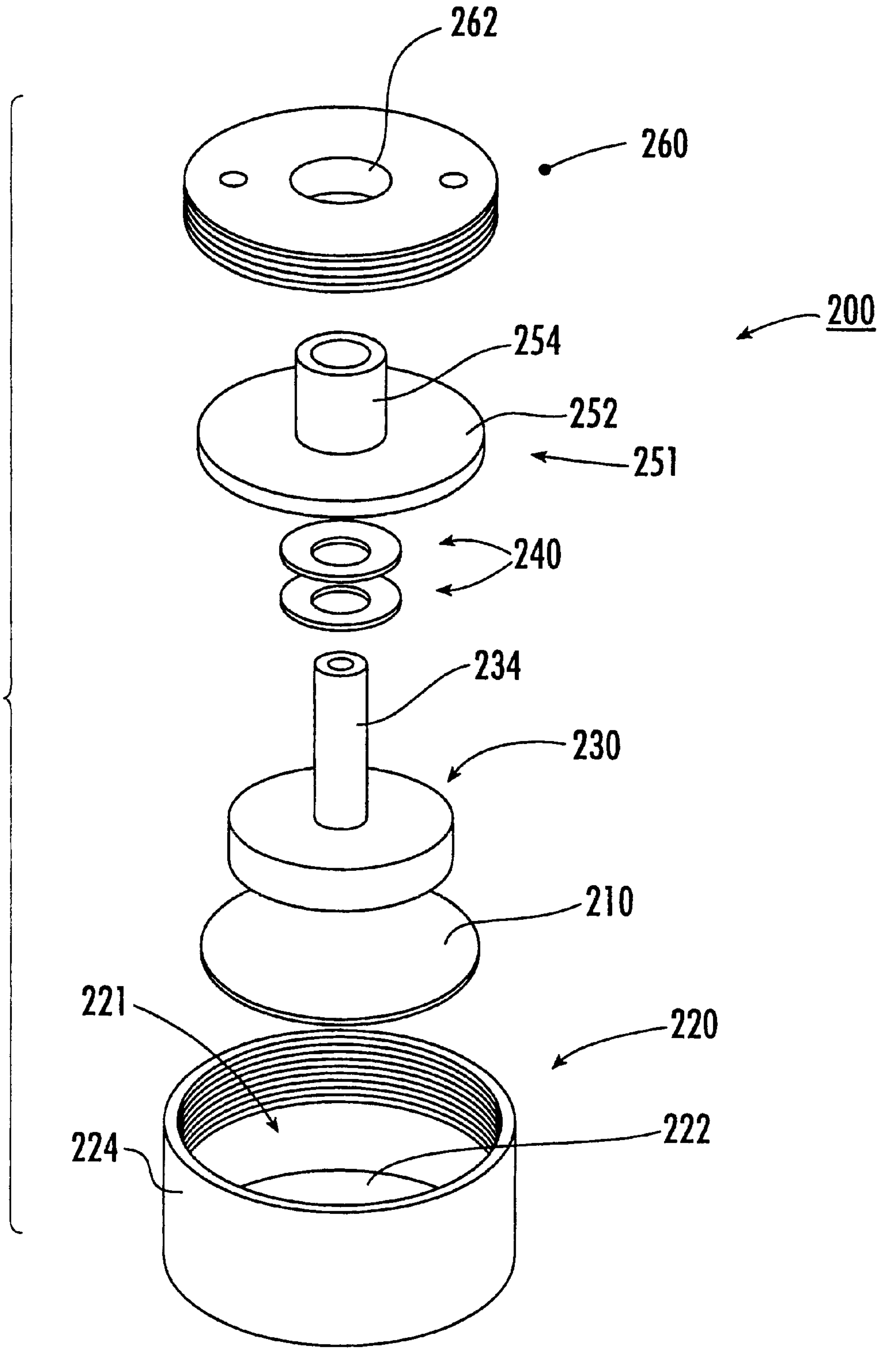
FIG. 5 is an exploded, perspective view of a varistor device according to a second embodiment of the present invention.
Figure 6:
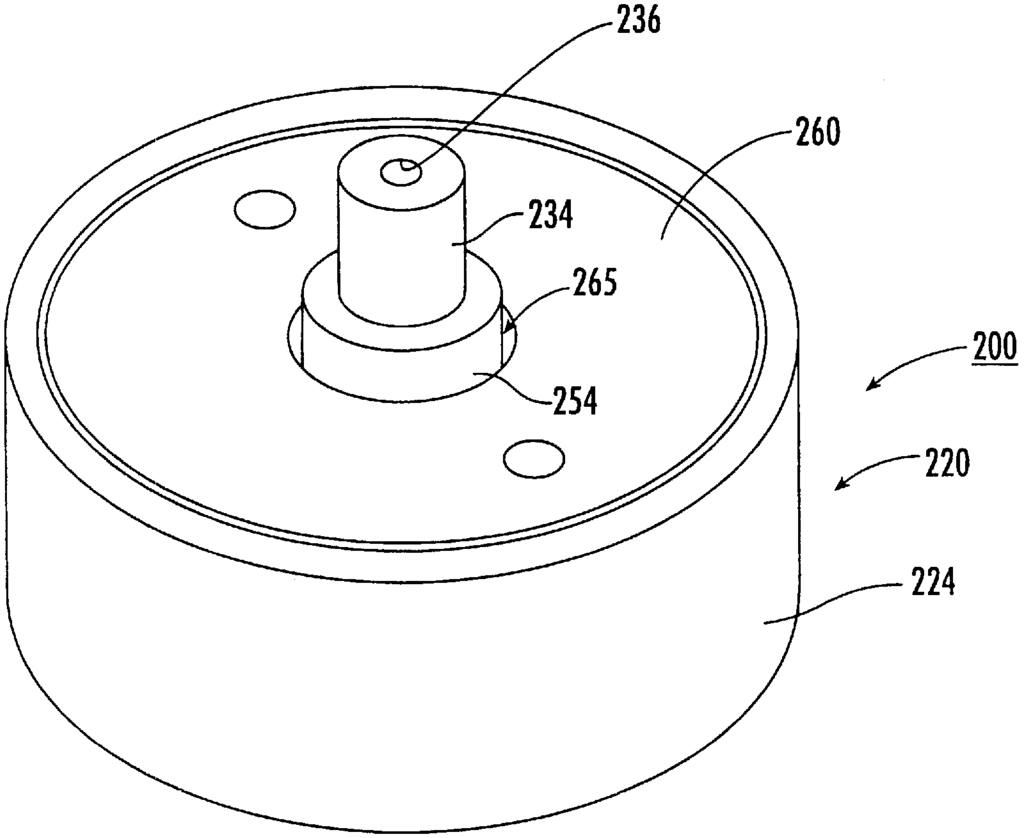
FIG. 6 is a top perspective view of the varistor device of FIG. 5.
Figure 7:
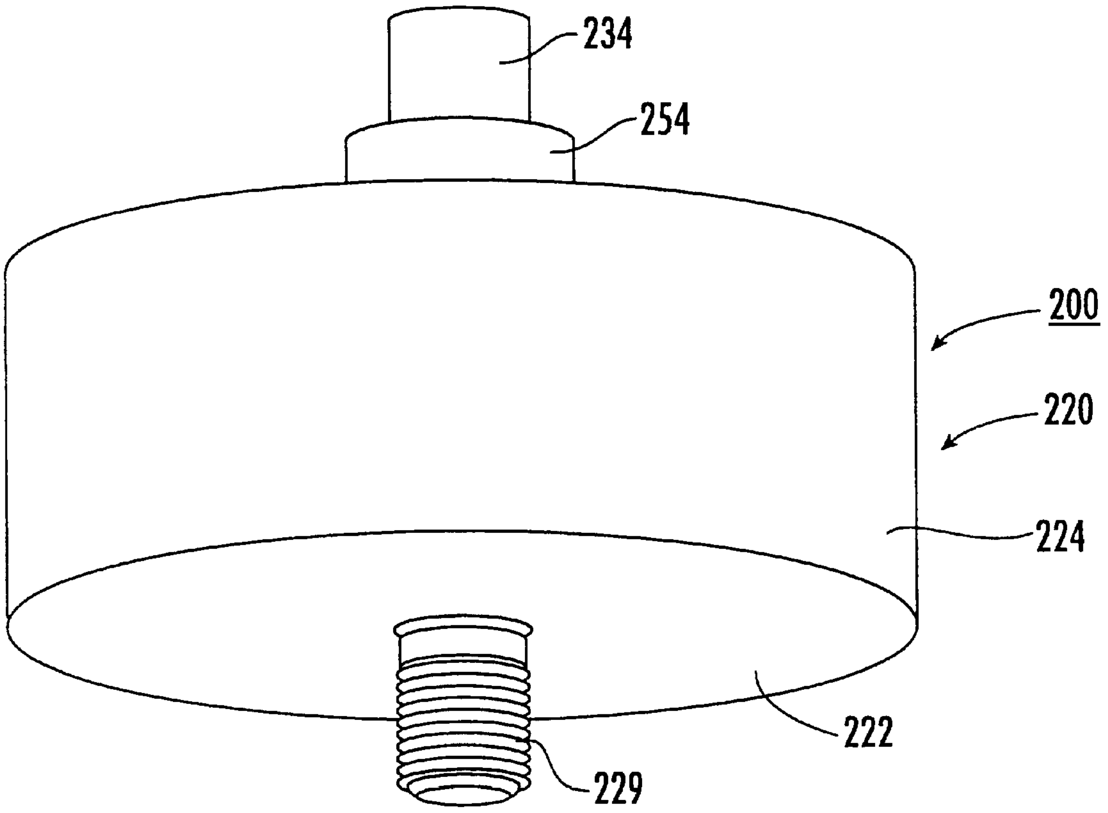
FIG. 7 is a bottom perspective view of the varistor device of FIG. 5.

With reference to FIG. 4, the varistor wafer 110 has a first substantially planar contact surface 112 and a second, opposed, substantially planar contact surface 114. As used herein, the term "wafer" means a substrate having a thickness which is relatively small compared to its diameter, length or width dimensions. The varistor wafer 110 is preferably disk shaped. However, the varistor wafer may be formed in other shapes. The thickness T and the diameter D of the varistor 110 will depend on the varistor characteristics desired for the particular application. Preferably, and as shown, the varistor wafer 110 includes a wafer 111 of varistor material coated on either side with a conductive coating 112A, 114A, so that the exposed surfaces of the coatings 112A and 114A serve as the contact surfaces 112 and 114. Preferably, the coatings 112A, 114A are formed of aluminum, copper or solder.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The varistor material wafer 111 is preferably formed by first forming a rod or block(not shown) of the varistor material and then slicing the wafer 111 from the rod using a diamond cutter or other suitable device. The rod may be formed by extruding or casting a rod of the varistor material and thereafter sintering the rod at high temperature in an oxygenated environment. This method of forming allows for the formation of a wafer having more planar surfaces and less warpage or profile fluctuation than would typically be obtained using a casting process. The coatings 112A, 114A are preferably formed of aluminum or copper and may be flame sprayed onto the opposed sides of the wafer 111.

While the device 100 as shown in FIG. 1 includes two spring washers 140, more or fewer may be used. Each spring washer 140 includes a hole 142 which receives the shaft 134 of the electrode 130. Each spring washer 140 surrounds a portion of the shaft 134 immediately adjacent to the head 132 and abuts the rear face of the head 132 or the preceding spring washer 140. Each hole 142 preferably has a diameter of between about 0.012 and 0.015 inch greater than the corresponding diameter of the shaft 134. The spring washers 140 are preferably formed of a resilient material and, more preferably, the spring washers 140 are Belleville washers formed of spring steel.

The insulator ring 150 overlies and abuts the outermost spring washer 140. The insulator ring 150 has a hole 152 formed therein which receives the shaft 134. Preferably, the diameter of the hole 152 is between about 0.005 and 0.007 inch greater than the corresponding diameter of the shaft 134. The insulator ring 150 is preferably formed of an electrically insulating material having high melting and combustion temperatures. More preferably, the insulator ring 150 is formed of polycarbonate, ceramic or a high temperature polymer.

The end cap 160 overlies and abuts the insulator ring 150. The end cap 160 has a hole 162134. Preferably, the shaft 134. Preferably, the diameter of the hole 162 is between about 0.500 and 0.505 inch greater than the corresponding diameter of the shaft 134 to provide a sufficient clearance gap 165 (FIG. 2) to avoid electrical arcing between the end cap 160 and the electrode shaft 134 during non-overvoltage conditions. Threads 168 on the peripheral wall of the end cap 160 engage complementary threads 128 formed in the housing 120. Holes 163 are formed in the end cap to receive a tool (not shown) for rotating the end cap 160 with respect to the housing 120. Other means for receiving a tool, for example, a hex-shaped slot, may be provided in place of or in addition to the holes 163. The end cap 160 has an annular ridge 167 which is received within the inner diameter of the housing 120. The housing 120 includes a rim 127 to prevent overinsertion of the end cap 150. Preferably, the end cap is formed of aluminum.

As noted above and as best shown in FIG. 3, the electrode head 132 and the center wall 122 are loaded against the varistor wafer 110 to ensure firm and uniform engagement between the surfaces 112 and 132A and between the surfaces 114 and 122A. This aspect of the device 100 may be appreciated by considering a method according to the present invention for assembling the device 100. The varistor wafer 110 is placed in the cavity 121 such that the wafer surface 114 engages the contact surface 122A. The electrode 130 is inserted into the cavity 121 such that the contact surface 132A engages the varistor wafer surface 112. The spring washers 140 are slid down the shaft 134 and placed over the head 132. The insulator ring 150 is slid down the shaft 134 and over the outermost spring washer 140. The end cap 160 is slid down the shaft 134 and screwed into the opening 126 by engaging the threads 168 with the threads 128 and rotating.

Once the device 100 has been assembled as just described, the end cap 160 is selectively torqued to force the insulator ring 150 downwardly so that it partially deflects the spring washers 140. The loading of the end cap 160 onto the insulator ring 150 and from the insulator ring onto the spring washers 140 is in turn transferred to the head 132. In this way, the varistor wafer 110 is sandwiched (clamped) between the head 132 and the center wall 122.

Preferably, the device 100 is designed such that the desired loading will be achieved when the spring washers 150 are only partially deflected and, more preferably, when the spring washers are fifty percent (50%) deflected. In this way, variations in manufacturing tolerances of the other components of the device 100 may be accommodated.

The amount of torque applied to the end cap 160 will depend on the desired amount of load between the varistor wafer 110 and the head 132 and the center wall 122. Preferably, the amount of the load of the head and the center wall against the varistor wafer is at least 264 lbs. More preferably, the load is between about 528 and 1056 lbs. Preferably, the coatings 112A and 114A have a rough initial profile and the compressive force of the loading deforms the coatings to provide more continuous engagements between the coatings and the contact surfaces 122A and 132A.

Alternatively, or additionally, the desired load amount may be obtained by selecting an appropriate number and or sizes of spring washers 140. The spring washers each require a prescribed amount of load to deflect a prescribed amount and the overall load will be the sum of the spring deflection loads.

Preferably, the area of engagement between the contact surface 132A and the varistor wafer surface 112 is at least 1.46 square inches. Likewise, the area of engagement between the contact surface 122A and the varistor wafer surface 114 is preferably at least 1.46 square inches. Preferably, the electrode head 132 has a thickness H of at least 0.50 inch. The center wall 122 preferably has a thickness W of at least 0.25 inch.

The combined thermal mass of the housing 120 and the electrode 130 should be substantially greater than the thermal mass of the varistor wafer 110. As used herein, the term "thermal mass" means the product of the specific heat of the material or materials of the object (e.g., the varistor wafer 110) multiplied by the mass or masses of the material or materials of the object. That is, the thermal mass is the quantity of energy required to raise one gram of the material or materials of the object by one degree centigrade times the mass or masses of the material or materials in the object. Preferably, the thermal masses of each of the electrode head 132 and the center wall 122 are substantially greater than the thermal mass of the varistor wafer 110. Preferably, the thermal masses of each of the electrode head 132 and the center wall 122 are at least two (2) times the thermal mass of the varistor wafer 110, and, more preferably, at least ten (10) times as great.

The overvoltage protection device 100 provides a number of advantages for safely, durably and consistently handling extreme and repeated overvoltage conditions. The relatively large thermal masses of the housing 120 and the electrode 130 serve to absorb a relatively large amount of heat from the varistor wafer 110, thereby reducing heat induced destruction or degradation of the varistor wafer as well as reducing any tendency for the varistor wafer to produce sparks or flame. The relatively large thermal masses and the substantial contact areas between the electrode and the housing and the varistor wafer provide a more uniform temperature distribution in the varistor wafer, thereby minimizing hot spots and resultant localized depletion of the varistor material.

The loading of the electrode and the housing against the varistor wafer as well as the relatively large contact areas provide a more even current distribution through the varistor wafer 10. As a result, the device 100 responds to overvoltage conditions more efficiently and predictably, and high current spots which may cause pinholing are more likely to be avoided. The tendency for the varistor wafer 110 to warp responsive to high current impulses is reduced by the mechanical reinforcement provided by the loaded head 132 and center wall 122. The spring washers may temporarily deflect when the varistor wafer expands and return when the varistor wafer again contracts, thereby maintaining the load throughout and between multiple overvoltage events. Moreover, during an overvoltage event, the device 100 will generally provide lower inductance and lower resistance because of the more uniform and efficient current distribution through the varistor wafer.

The device 100 also serves to prevent or minimize the expulsion of flame, sparks and/or varistor material upon overvoltage failure of the varistor wafer 110. The strength of the metal housing as well as the configuration of the electrode 130, the insulator ring 150 and the end cap 160 serve to contain the products of a varistor wafer failure. In the event that the varistor destruction is so severe as to force the electrode 130 away from the varistor and melt the insulator ring 150, the electrode 130 will be displaced into direct contact with the end cap 160, thereby shorting the electrode 130 and the housing 120 and causing an in-line fuse (not shown) to blow.

While the housing 120 is illustrated as cylindrically shaped, the housing may be shaped differently. The lower half of the device 100 may be deleted, so that the device 100 includes only an upper housing wall 124 and a single varistor wafer, electrode, spring washer or set of spring washers, insulator ring and end cap.

Methods for forming the several components of the device will be apparent to those of skill in the art in view of the foregoing description. For example, the housing 120, the electrode 130, and the end cap 160 may be formed by machining, casting or impact molding. Each of these elements may be unitarily formed or formed of multiple components fixedly joined, by welding, for example.

With reference to FIGS. 5–8, a varistor device 200 according to a second embodiment of the present invention is shown therein. The varistor device 200 includes elements 210, 230, 240 and 260 corresponding to elements 110, 130, 140 and 160, respectively, of the varistor device 100. The varistor device 200 differs from the varistor device 100 in that the device 200 includes only a single varistor wafer 210 and corresponding components. The varistor device 200 includes a housing 220 which is the same as the housing 120 except as follows. The housing 220 defines only a single cavity 221, and has only a single surrounding wall 224 extending from the center (or end) wall 222 thereof. Also, the housing 220 has a threaded stud 229 (FIG. 7) extending from the lower surface of the center (or end) wall 222 rather than a sidewardly extending electrode ear corresponding to the electrode ear 129. The stud 229 is adapted to engage a threaded bore of a conventional electrical service utility box or the like.

The varistor device 200 further differs from the varistor device 100 in the provision of an insulator ring 251. The insulator ring 251 has a main body ring 252 corresponding to the insulator ring 150. The ring 251 further includes a collar 254 extending upwardly from the main body ring 252. The inner diameter of the collar 254 is sized to receive the shaft 234 of the electrode 230, preferably in clearance fit. The outer diameter of the collar 254 is sized to pass through the hole 262 of the end cap 260 with a prescribed clearance gap 265 (FIG. 6) surrounding the collar 254. The gap 265 allows clearance for inserting the shaft 134 and may be omitted. The main body ring 252 and the collar 254 are preferably formed of the same material as the insulator ring 150. The main body ring 252 and the collar 254 may be bonded or integrally molded.

Figure 8:
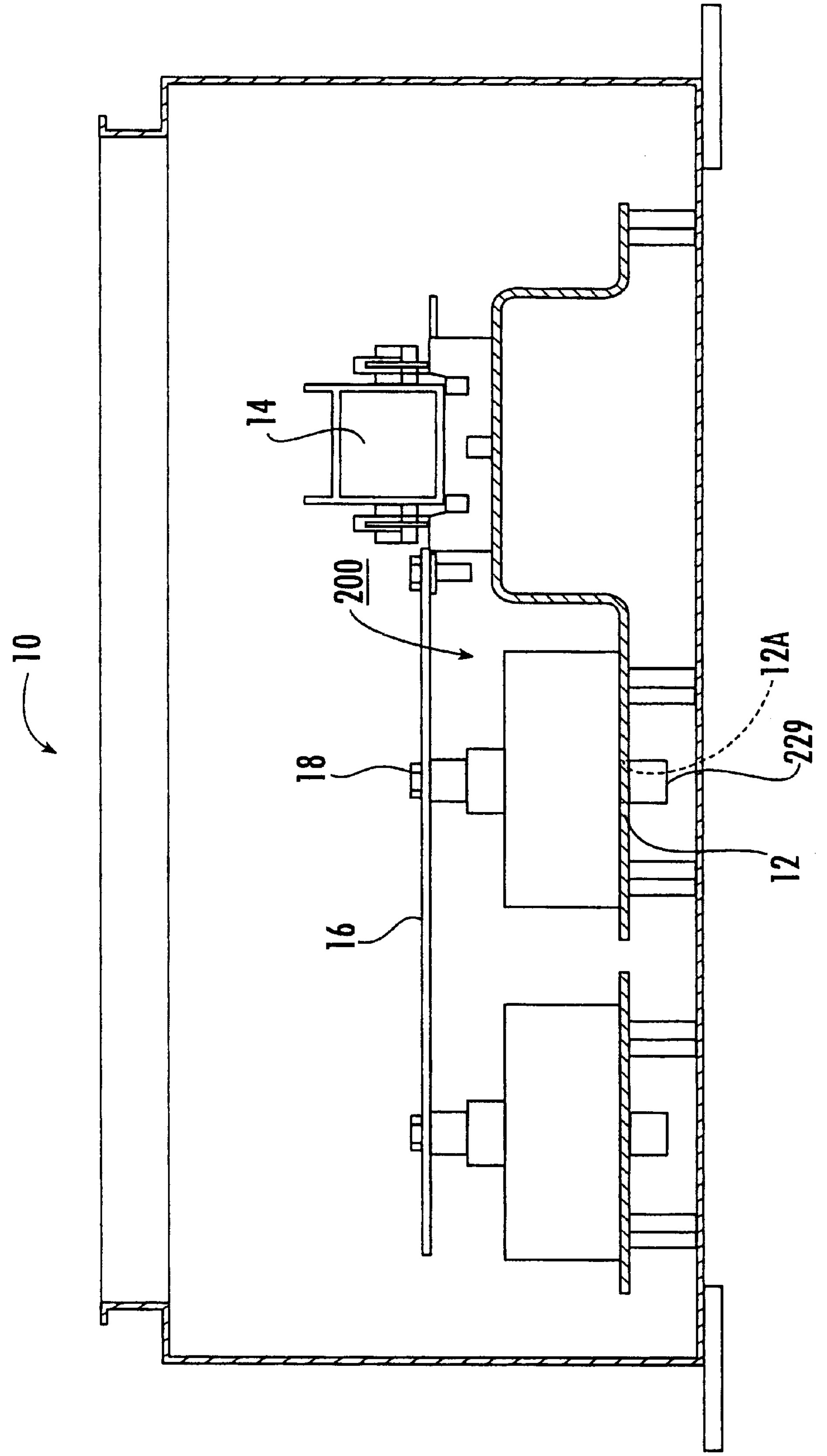
FIG. 8 is a view of the varistor device of FIG. 5,in which the varistor device is mounted in an electrical service utility box.

With reference to FIG. 8, the varistor device 200 is shown therein mounted in an electrical service utility box 10. The varistor device 200 is mounted on a metal platform 12 electrically connected to earth ground. The electrode stud 229 engages and extends through a threaded bore 12A in the platform 12. A bus bar 16, electrically connected a first end of a fuse 14, is secured to the electrode shaft 234 by a threaded bolt 18 inserted into the threaded bore 236 of the electrode 230. A second end of the fuse may be connected to an electrical service line or the like. As shown in FIG. 8, a plurality of varistor devices 200 may be connected in parallel in a utility box 10.

Figure 9:
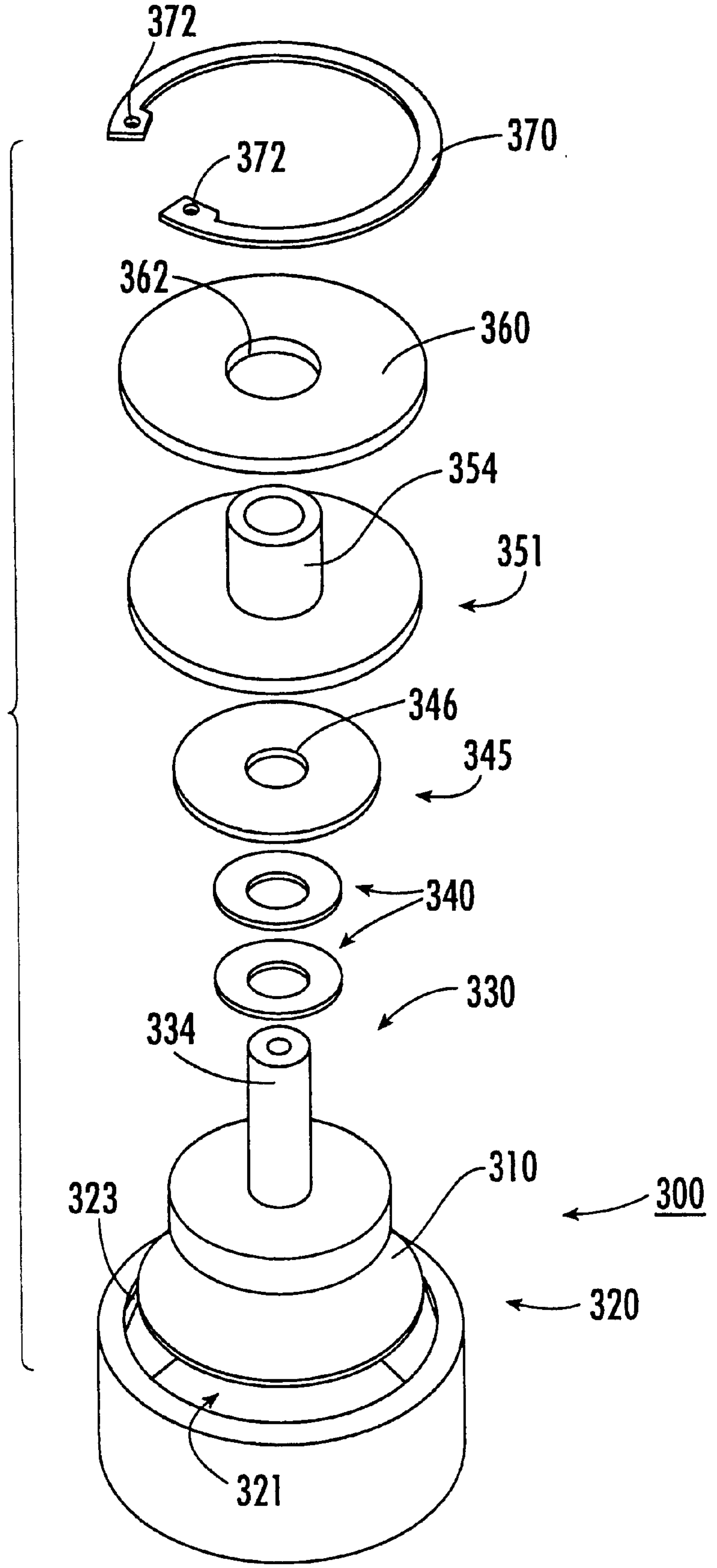
FIG. 9 is an exploded, perspective view of a varistor device according to a third embodiment of the present invention.
Figure 10:
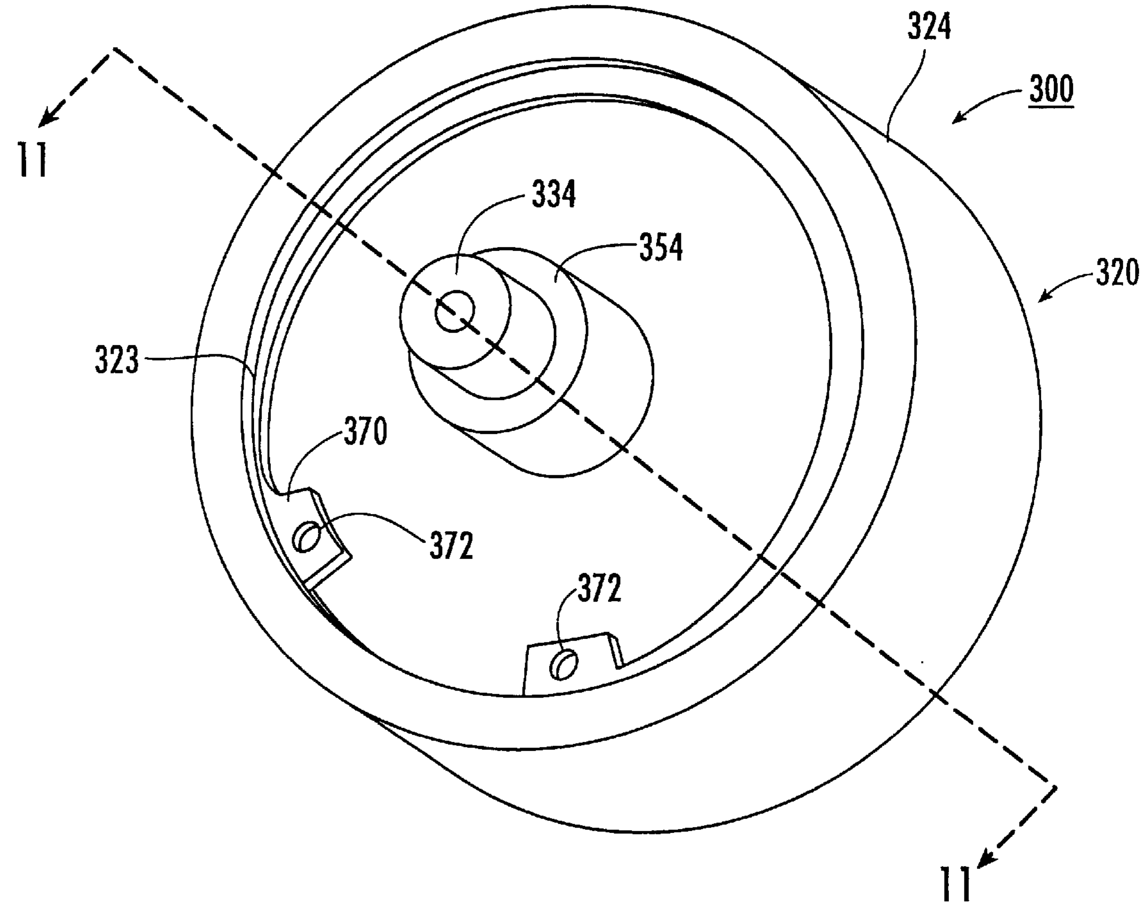
FIG. 10 is a top, perspective view of the varistor device of FIG. 9.
Figure 11:
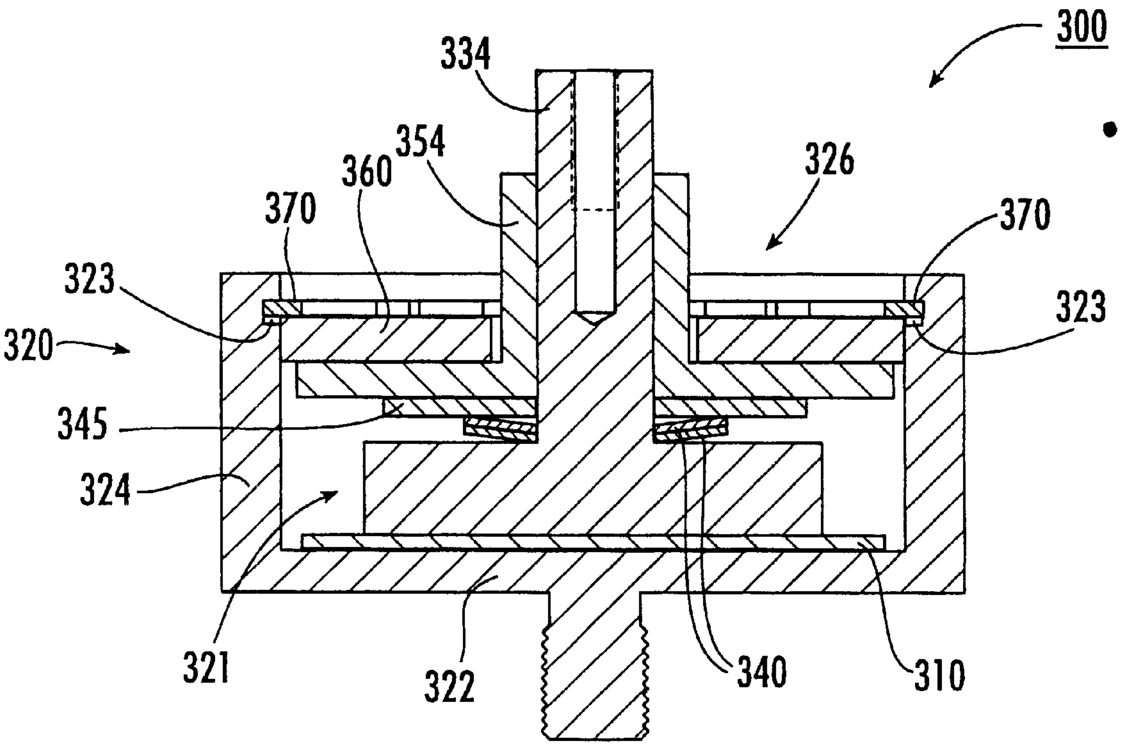
FIG. 11 is a cross-sectional view of the varistor device of FIG. 9 taken along the line 11—11 of FIG. 10.

With reference to FIGS. 9–11, a varistor device 300 according to a third embodiment of the present invention is shown therein. The varistor device 300 includes elements 310, 330, 340 and 351 corresponding to elements 210, 230, 240 and 251, respectively. The varistor device 300 also includes a flat metal washer 345 interposed between the uppermost spring washer 340 and the insulator ring 351, the shaft 334 extending through a hole 346 formed in the washer 345. The washer 345, which may be incorporated into the devices 100, 200, serves to distribute the mechanical load of the uppermost spring washer 340 to prevent the spring washer from cutting into the insulator ring 351. The housing 320 is the same as the housing 220 except as follows.

The housing 320 of device 300 does not have a rim corresponding to the rim 127 or threads corresponding to the threads 128. Also, the housing 320 has an internal annular slot 323 formed in the surrounding sidewall 324 and extending adjacent the opening 326 thereof.

The varistor device 300 also differs from the varistor devices 100, 200 in the manner in which the electrode 330 and the center wall 322 are loaded against the varistor wafer 310. In place of the end caps 160, 260, the varistor device 300 has an end cap 360 and a resilient clip 370. The clip 370 is partly received in the slot 323 and partly extends radially inwardly from the inner wall of the housing 320 to limit outward displacement of the end cap 360. The clip 370 is preferably formed of spring steel. The end cap 360 is preferably formed of aluminum.

The varistor device 300 may be assembled in the same manner as the varistor devices 100, 200 except as follows. The end cap 360 is placed over the shaft 334 and the collar 354, each of which are received in a hole 362. The washer 345 is placed over the shaft 334 prior to placing the insulator ring 351. A jig (not shown) or other suitable device is used to force the end cap 360 down, in turn deflecting the spring washers 340. While the end cap 360 is still under the load of the jig, the clip 370 is compressed, preferably by engaging apertures 372 with pliers or another suitable tool, and inserted into the slot 323. The clip 370 is then released and allowed to return to its original diameter, whereupon it partly fills the slot and partly extends radially inward into the cavity 321 from the slot 323. The clip 370 and the slot 323 thereby serve to maintain the load on the end cap 360.

Means other than those described above may be used to load the electrode and housing against the varistor wafer. For example, the electrode and end cap may be assembled and loaded, and thereafter secured in place using a staked joint.

In each of the aforedescribed devices 100, 200, 300, multiple varistor wafers (not shown) may be stacked and sandwiched between the electrode head and the center wall. The outer surfaces of the uppermost and lowermost varistor wafers would serve as the wafer contact surfaces. However, the properties of the varistor wafer are preferably modified by changing the thickness of a single varistor wafer rather than stacking a plurality of varistor wafers.

As discussed above, the spring washers 140 are preferably Belleville washers. Belleville washers may be used to apply relatively high loading without requiring substantial axial space. However, other types of biasing means may be used in addition to or in place of the Belleville washer or washers. Suitable alternative biasing means include one or more coil springs, wave washers or spiral washers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An overvoltage protection device comprising:

a) a housing including a first substantially planar contact surface and a sidewall, said housing defining a cavity therein and having an opening in communication with said cavity;

b) an electrode member including a substantially planar second contact surface facing said first contact surface and disposed within said cavity, a portion of said electrode member extending out of said cavity and through said opening; and c) a wafer formed of varistor material and having first and second opposed, substantially planar wafer surfaces, said wafer positioned within said cavity and between said first and second contact surfaces with said first and second wafer surfaces engaging said first and second contact surfaces, respectively;

d) wherein said first and second contact surfaces apply a load to said first and second wafer surfaces.

2. The device of claim 1 wherein said load is at least 264 lbs.

3. The device of claim 1 wherein said load is between about 528 and 1056 lbs.

4. The device of claim 1 including adjustable means maintaining said load such that the amount of said load may be selectively adjusted.

5. The device of claim 1 including biasing means for maintaining said load.

6. The device of claim 5 wherein said biasing means includes a spring member biasing at least one of said first and second contact surfaces against said wafer.

7. The device of claim 6 including a plurality of spring members biasing at least one of said first and second contact surfaces against said wafer.

8. The device of claim 6 wherein said spring member includes a spring washer.

9. The device of claim 6 wherein said spring member includes a Belleville washer.

10. The device of claim 1 including an end cap positioned in said opening, said end cap maintaining said load.

11. The device of claim 10 including a clip operative to limit displacement between said end cap and said housing to maintain said load.

12. The device of claim 11 wherein said housing includes a slot formed therein and said clip engages said slot.

13. The device of claim 10 wherein said housing includes a threaded portion and said end cap includes a threaded portion engaging said housing threaded portion whereby said end cap is operable to selectively adjust and maintain said load.

14. The device of claim 10 including a spring member interposed between said end cap and said wafer.

15. The device of claim 1 including an electrically insulating member interposed between said second contact surface and said opening.

16. The device of claim 1 including an end cap positioned in said opening and having a hole formed therein, wherein said electrode member includes a head positioned in said cavity between said end cap and said first contact surface and a shaft extending out of said cavity and through said end cap hole.

17. The device of claim 16 including an electrically insulating ring member having a hole formed therein, said insulating ring member interposed between said head and said end cap, wherein said shaft extends through said insulating ring member hole.

18. The device of claim 16 including a spring washer having a hole formed therein, said spring washer interposed between said head and said end cap, wherein said shaft extends through said spring washer hole.

19. The device of claim 16 including an electrically insulating ring member and a spring washer, said electrically insulating ring member having a hole formed therein and interposed between head and said end cap, said spring washer having a hole formed therein and interposed between head and said electrically insulating ring member, wherein said shaft extends through each of said electrically insulating ring member hole and said spring washer hole.

20. The device of claim 1 wherein said housing and said electrode member have a combined thermal mass which is substantially greater than a thermal mass of said wafer.

21. The device of claim 1 wherein said housing is formed of metal.

22. The device of claim 1 wherein said wafer is formed by slicing a rod of varistor material.

23. The device of claim 22 wherein said rod is formed by at least one of extruding and casting.

24. The device of claim 22 wherein said varistor material is selected from the group consisting of a metal oxide compound and silicon carbide.

25. The device of claim 22 wherein said wafer includes a coating of conductive metal on at least one of said first and second wafer surfaces.

26. The device of claim 22 wherein said wafer has a substantially circular peripheral edge and each of said first and second disk surfaces are substantially coextensive with said circular peripheral edge.

27. The device of claim 1 wherein each of said first and second contact surfaces is continuous and substantially free of voids.

28. An overvoltage protection device comprising:

a) a housing including a first substantially planar contact surface and a sidewall, said housing defining a cavity therein and having an opening in communication with said cavity;

h) an electrode member including a substantially planar second contact surface facing said first contact surface and disposed within said cavity, a portion of said electrode member extending out of said cavity and through said opening;

c) a wafer formed of varistor material and having first and second opposed, substantially planar wafer surfaces, said wafer positioned within said cavity and between said first and second contact surfaces with said first and second wafer surfaces engaging said first and second contact surfaces, respectively;

d) an end cap positioned in said opening and having a hole formed therein, wherein said electrode member includes a head positioned in said cavity between said end cap and said first contact surface and a shaft extending out of said cavity and through said end cap hole; and e) an electrically insulating ring member having a hole formed therein, said insulating ring member interposed between said head and said end cap, wherein said shaft extends through said insulating ring member hole, wherein said insulating ring member includes a main body ring portion and a projecting collar, said projecting collar surrounding said shaft and extending through said end cap hole.

29. An overvoltage protection device comprising:

a) a housing including a first substantially planar contact surface and a sidewall, said housing defining a cavity therein and having an opening in communication with said cavity;

b) an electrode member including a substantially planar second contact surface facing said first contact surface and disposed within said cavity, a portion of said electrode member extending out of said cavity and through said opening;

c) a wafer formed of varistor material and having first and second opposed, substantially planar wafer surfaces, said wafer positioned within said cavity and between said first and second contact surfaces with said first and second wafer surfaces engaging said first and second contact surfaces, respectively;

d) wherein said housing and said electrode member have a combined thermal mass which is substantially greater than a thermal mass of said wafer; and e) wherein said first electrode member includes an electrode wall and said second electrode member includes a head, each of said electrode wall and said head contacting one of said wafer surfaces and having a thermal mass which is substantially greater than said wafer thermal mass.

30. The device of claim 29 wherein said thermal masses of said electrode wall and said head are each at least twice said wafer thermal mass.

31. The device of claim 29 wherein said thermal masses of said electrode wall and said head are each at least ten times said wafer thermal mass.

32. An overvoltage protection device comprising:

a) a housing including an electrode wall and a sidewall, said electrode wall and said sidewall defining a cavity and an opening in communication with said cavity, said electrode wall having a thermal mass and a first substantially planar contact surface;

b) an electrode member including a head positioned in said cavity and a shaft extending out of said cavity and through said opening, said head having a thermal mass and a substantially planar second contact surface facing said first contact surface;

c) a wafer formed of varistor material and having first and second opposed, substantially planar wafer surfaces, said wafer positioned within said cavity and between said first and second contact surfaces with said first and second wafer surfaces engaging said first and second contact surfaces, respectively, said wafer having a thermal mass;

d) an end cap positioned in said opening, said end cap having a hole through which said shaft extends;

e) a spring member interposed between said end cap and said head, and said spring member biasing at least one of said electrode wall and said electrode member against said wafer to apply a load to said first and second wafer surfaces; and f) wherein each of said head thermal mass and said electrode wall thermal mass is substantially greater than said thermal mass of said wafer.

33. The device of claim 32 wherein said load is at least 264 lbs.

34. The device of claim 32 wherein said thermal masses of said electrode wall and said head are each at least ten times said wafer thermal mass.

35. The device of claim 32 wherein said wafer is formed by slicing a rod of said varistor material.

36. The device of claim 32 including a clip and wherein said housing includes a slot formed therein, said clip cooperative with said slot to limit displacement of said end cap relative to said housing and to maintain said load.

37. The device of claim 32 wherein said housing includes a threaded portion and said end cap includes a threaded portion engaging said housing threaded portion whereby said end cap is operable to selectively adjust and maintain said load.

38. The device of claim 32 including an electrically insulating ring member, said insulator ring member having a hole formed therein and interposed between said head and said end cap, said spring member having a hole formed therein and interposed between head and said insulating ring member whereby said spring member biases said head against said wafer, wherein said shaft extends through each of said insulating ring member hole and said spring member hole.

39. The device of claim 38 wherein said insulating ring member includes a main body ring portion and a projecting collar, said projecting collar surrounding said shaft and extending through said end cap hole.

40. An overvoltage protection device comprising:

a) a first electrode member having a first substantially planar contact surface;

b) a second electrode member having a second substantially planar contact surface facing said first contact surface;

c) a wafer formed of varistor material and having first and second opposed, substantially planar wafer surfaces, said wafer positioned between said first and second contact surfaces with said first and second wafer surfaces engaging said first and second contact surfaces, respectively; and d) biasing means biasing at least one of said first and second contact surfaces against said wafer to apply a load to said first and second wafer surfaces.

41. The device of claim 40 wherein said load is at least 264 lbs.

42. The device of claim 40 wherein said load is between about 528 and 1056 lbs.

43. The device of claim 40 wherein said biasing means includes a spring member biasing at least one of said first and second electrode members against said wafer.

44. The device of claim 40 including a plurality of spring members biasing at least one of said first and second electrode members against said wafer.

45. The device of claim 40 wherein said spring member includes a spring washer.

46. The device of claim 45 wherein said spring member includes a Belleville washer.

47. A method for assembling an overvoltage protection device, said method comprising the steps of:

a) providing a first electrode member having a first substantially planar contact surface;

b) providing a second electrode member having a second substantially planar contact surface facing the first contact surface;

c) providing a biasing means;

c) placing a wafer formed of varistor material and having first and second opposed, substantially planar wafer surfaces between the first and second contact surfaces such that the first and second wafer surfaces engage the first and second contact surfaces, respectively;

d) biasing the biasing means to apply a load between the first and second contact surfaces and against the first and second wafer surfaces; and e) maintaining the load during an overvoltage event.

48. The method of claim 47 wherein the biasing means includes a spring member and said step of biasing includes deflecting the spring member.

* * * * *

UNITED STATES PATENT AND TRADEMARK OFFICE

CERTIFICATE OF CORRECTION

PATENT NO. : 6,038,119

DATED : March 14, 2000

INVENTOR(S) : Atkins, et al

It is certified that error appears in the above-identified patent and that said Letters Patent is hereby corrected as shown below:

Column 5, Line 20 replace "162134" by --162 which receives the shaft 134 --.

Column 10, Line 63 replace "h)" by -- b) --.

Column 11, Claim 29, line 41, delete "first electrode member" and insert --housing--.

Column 11, Claim 29, line 42, delete "second".

Signed and Sealed this

Seventeenth Day of October, 2000

Attest:

Q. TODD DICKINSON

*Attesting Officer* *Director of Patents and Trademarks*